United States Patent
Baldwin et al.

[11] Patent Number: 5,936,967
[45] Date of Patent: Aug. 10, 1999

[54] MULTI-CHANNEL BROADBAND ADAPTATION PROCESSING

[75] Inventors: John H. Baldwin, Morristown; Behram Homi Bharucha, Millburn; Bharat Tarachand Doshi, Holmdel; Subrahmanyam Dravida, Freehold; Sanjiv Nanda, Plainsboro, all of N.J.

[73] Assignee: Lucent Technologies, Inc., Murray Hill, N.J.

[21] Appl. No.: 08/757,208

[22] Filed: Nov. 27, 1996

Related U.S. Application Data

[63] Continuation-in-part of application No. 08/323,958, Oct. 17, 1994, Pat. No. 5,606,552.

[51] Int. Cl.[6] .................................................. H04J 3/16
[52] U.S. Cl. ................................. 370/474; 370/472
[58] Field of Search .................................. 370/535, 537, 370/389, 474, 471, 395, 310, 347, 341, 342, 335, 320, 503, 349, 338, 397, 399, 401, 522, 465, 466, 467, 472, 469, 475, 476, 479, 442

[56] References Cited

U.S. PATENT DOCUMENTS

| | | | |
|---|---|---|---|
| 4,688,035 | 8/1987 | Gray et al. | 340/825.52 |
| 5,050,166 | 9/1991 | Cantoni | 370/94.1 |
| 5,101,404 | 3/1992 | Kunimoto et al. | 370/60 |
| 5,153,920 | 10/1992 | Danner | 380/48 |
| 5,214,642 | 5/1993 | Kunimoto et al. | 370/82 |
| 5,363,369 | 11/1994 | Hemmady et al. | 370/60 |
| 5,414,707 | 5/1995 | Johnston et al. | 370/79 |
| 5,729,529 | 3/1998 | Martinsson | 370/397 |

OTHER PUBLICATIONS

CCITT Recommendation I.362–B–ISDN ATM Adaptation Layer (AAL) Functional Description.
CCITT Recommendation I.363–B–ISDN ATM Adaptation Layer (AAL) Specification.

*Primary Examiner*—Dang Ton

[57] ABSTRACT

A method and apparatus for transmitting and/or receiving variable-length packets (e.g., CDMA packets, CDPD packets) that are associated with different channels and which are multiplexed via a single virtual circuit (e.g., an ATM virtual circuit).

22 Claims, 5 Drawing Sheets

_5,936,967_

MULTI-CHANNEL BROADBAND ADAPTATION PROCESSING

CROSS-REFERENCE TO RELATED APPLICATIONS

This application is a continuation-in-part of U.S. application Ser. No. 08/323,958, filed Oct. 17, 1994, entitled "Broadband Adaptation Processing," which application is now U.S. Pat. No. 5,606,552.

FIELD OF THE INVENTION

The present invention relates to telecommunications systems in general, and, more particularly, to a method and apparatus for transmitting packetized user-data via a broadband network.

BACKGROUND OF THE INVENTION

FIG. 1 depicts a schematic diagram of a portion of a typical wireless telecommunications system in the prior art, which system serves a number of wireless terminals that are situated within a geographic area. The heart of a typical wireless telecommunication system is known as a Wireless Switching Center ("WSC"), a Mobile Switching Center ("MSC"), or, alternatively, as a Mobile Telephone Switching Office ("MTSO"). Typically, the WSC is connected to a number of base stations, which are dispersed throughout the geographic area serviced by the system, and the local and long-distance telephone networks. The WSC is responsible for, among other things, routing or "switching" channels between wireless terminals and between a wireless terminal and a wireline terminal, which is connected to the wireless telecommunication system via the local and/or long-distance networks.

The geographic area serviced by the wireless systems is partitioned into a number of spatially distinct areas called "cells." As depicted in FIG. 1, each cell is schematically represented by a hexagon; in practice, however, each cell usually has an irregular shape that depends on the topology of the terrain serviced by the system. Typically, each cell contains a base station, which comprises the antennas and radios that the base station uses to communicate with the wireless terminals, and also comprises the transmission equipment that the base station uses to communicate with the WSC.

For example, when wireless terminal 111 desires to communicate with wireless terminal 112, wireless terminal 111 sends its data to base station 100, which relays the data to WSC 120. Upon receipt of the data, and with the knowledge that it is intended for wireless terminal 112, WSC 120 then returns the data back to base station 100, which relays the data, via radio, to wireless terminal 112. Although it may appear odd that the data must be transmitted from the base station to the WSC only to be returned, it is necessary when the base station does not have switching capability. In general, the link between the base station and the WSC carries a great quantity of data, and as wireless systems carry more video and high-speed data, it becomes important for the link to and from the base stations to be capable of efficiently carrying large quantities of data.

SUMMARY OF THE INVENTION

Embodiments of the present invention enable a method and apparatus for transmitting and/or receiving variable-length packets (e.g., CDMA packets, CDPD packets, etc.) that are associated with different channels (e.g., users) and are multiplexed via a single ATM virtual circuit.

DETAILED DESCRIPTION

I. Introduction

For pedagogical purposes, the detailed description has been partitioned into five sections. This section provides a broad overview of the illustrative embodiment of the present invention that seeks to efficiently transport variable-length packets (e.g., Code Division Multiple Access ("CDMA") packets, Cellular Digital Packet Data ("CDPD") packets, etc.) in larger cells (e.g., Asynchronous Transfer Mode ("ATM") cells) over a broadband network (e.g., an ATM network). Although the illustrative embodiment of the present invention encapsulates variable-length CDMA size packets into fixed-length ATM cells, it will be clear to those skilled in the art that embodiments of the present invention can encapsulate any kind and/or size of packet into other kinds of cells and/or sized cells, including variable sized "cells" in Internet Protocol ("IP") based networks.

Section II of the detailed description discusses the methods and apparatus that the illustrative embodiment uses to encapsulate CDMA packets into ATM cells. Section III provides a detailed discussion of the methods and apparatus that the illustrative embodiment uses to reclaim the CDMA packets from an ATM cell stream.

Some embodiments of the present invention are capable of multiplexing a plurality of CDMA "channels" into a single ATM virtual circuit. For the purposes of this specification, a virtual circuit link is defined as a point-to-point uni-directional link in a broadband network (e.g. within an ATM interface between a user/server and a switch, between two switches, between a switch and a cross-connect, or between cross-connects). In the context of ATM and B-ISDN, a virtual circuit link corresponds to the notion of a virtual circuit identifier ("VCI") or virtual path identifier ("VPI") as defined in CCITT Recommendation I.113. A virtual circuit connection is an end-to-end connection consisting of one or more concatenated virtual circuit links. At the nodes (e.g, ATM switch, ATM cross-connects, etc.) the mapping between incoming VPI/VCI pairs and outgoing VPI/VCI pairs allows the ATM cells to be routed from source to destination.

Section IV presents a typical example of how four CDMA packets, three of which are associated with one channel and one of which is associated with another channel, are encapsulated into a single ATM virtual circuit connection. Section V presents a hardware apparatus that is capable of both encapsulating the CDMA packets and reclaiming them from an ATM cell stream.

Figure 1:
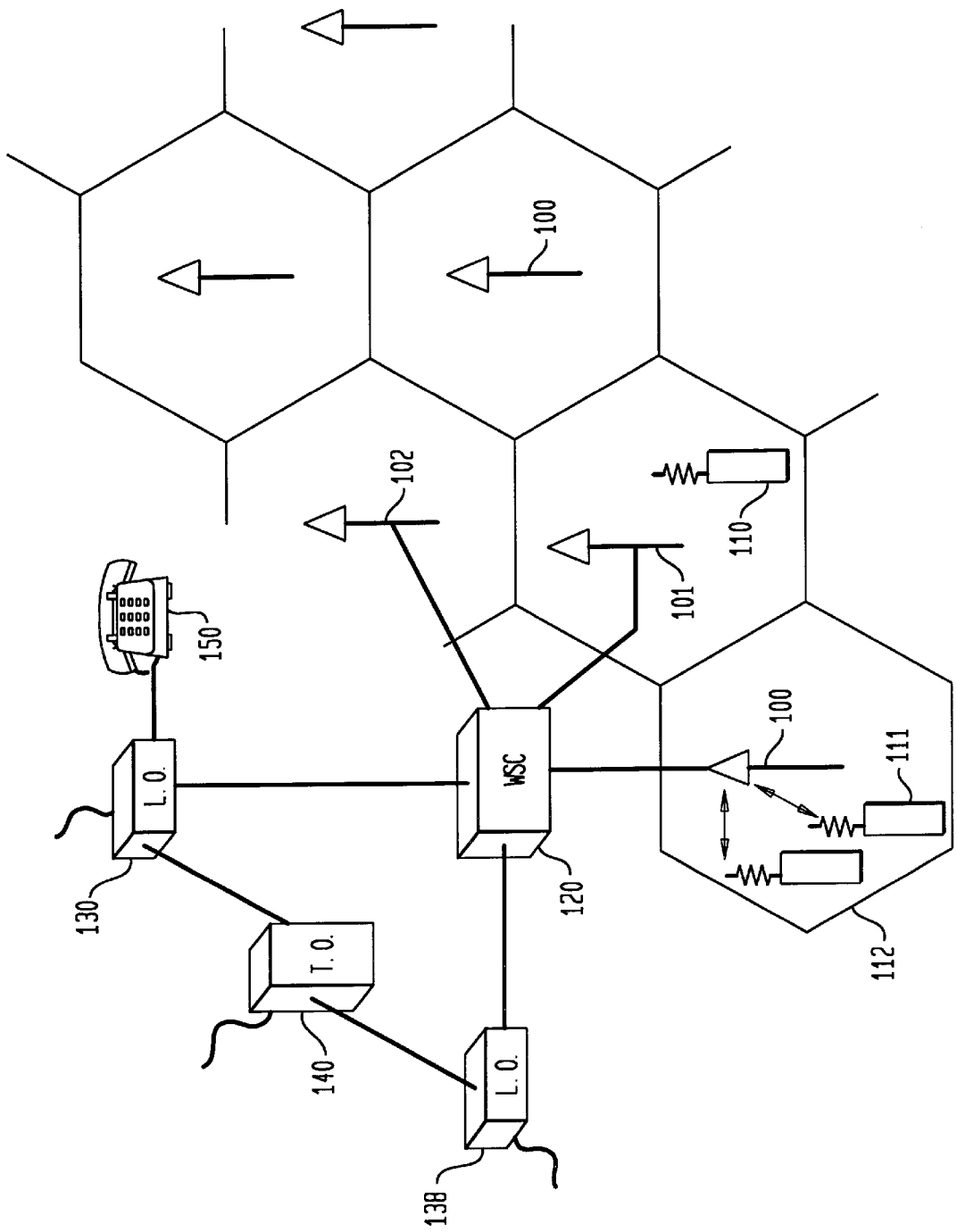
FIG. 1 depicts a schematic diagram of a portion of a typical wireless telecommunications system.
Figure 2:
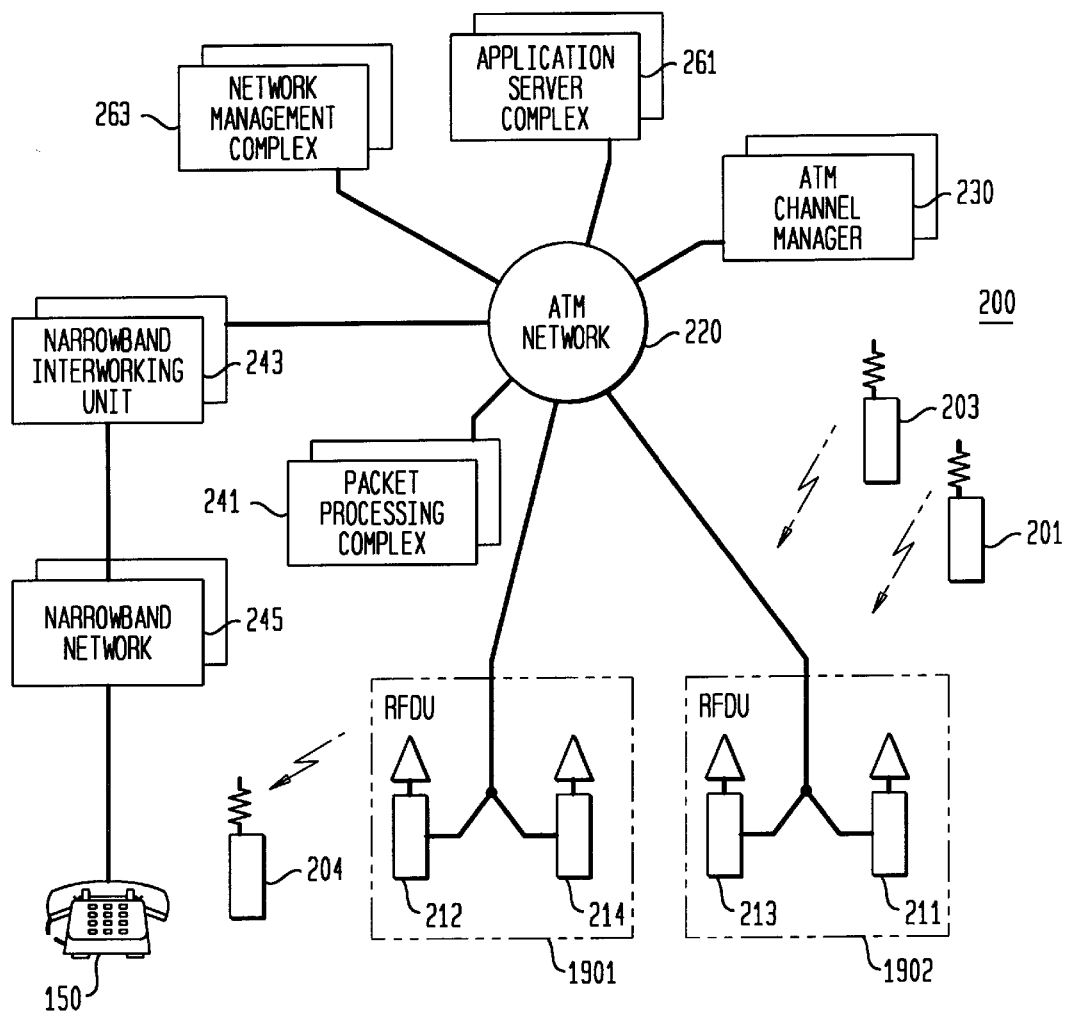
FIG. 2 depicts a schematic diagram of an illustrative embodiment of the present invention, which comprises an ATM-based wireless and wireline telecommunications system.

FIG. 2 depicts a schematic diagram of an illustrative embodiment of the present invention, which uses asynchronous transfer mode ("ATM") technology to transport data between the disparate components of the system (e.g., radio ports, the narrowband interworking unit, the application server complex, etc.) The disclosure of five United States patent applications are incorporated by reference: (1) U.S. Ser. No. 08/323,957, entitled "Broadband Networks for Wireless Services," filed Oct. 17, 1994, (2) U.S. Ser. No. 08/164,514, entitled "A Signaling System for Broadband Communications Networks," filed Dec. 9, 1993, (3) U.S. Ser. No. 08/164,521, entitled "Direct Signaling System for Narrowband Communications Networks," filed Dec. 9, 1993, (4) U.S. Ser. No. 08/323,958, entitled "Broadband Adaptation Processing," filed Oct. 17, 1994, and U.S. Ser. No. 08/630,147, entitled "Cellular System Architectures Supporting Data Services," filed Apr. 10, 1996." Further, the disclosure of D. J. Goodman, U.S. Pat. No. 4,916,691, issued Apr. 10, 1990 and J. H. Baldwin et al., U.S. Pat. No. 5,481,544, issued Jan. 2, 1996, and H. Chu et al., U.S. Pat. No. 5,539,744, issued Jul. 23, 1996 are also incorporated by reference.

Figure 3:
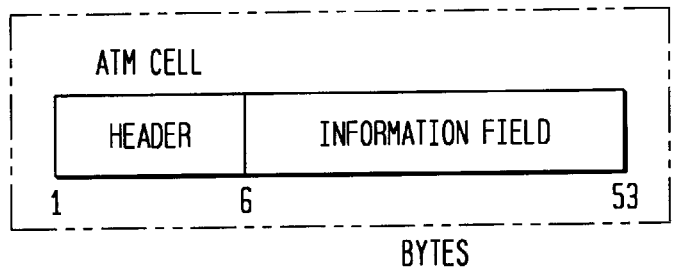
FIG. 3 depicts the format of an ATM cell.

An information (e.g., voice, data, video, etc.) transfer network using ATM technology is capable of carrying a 53 byte cell from a source to a destination. FIG. 3 depicts the format of an ATM cell. An ATM cell is a self-contained electronic message and, on one level of abstraction, it can be considered somewhat analogous to a paper postcard that is delivered by the post office. As shown in FIG. 3, the first 5 octets of the ATM cell is called the "header." The ATM cell header contains the virtual path identifier and virtual circuit identifier ("VPI/VCI") that the ATM network uses to route the cell to its proper destination. The other 48 octets of the ATM cell carries the cell's payload and is called the "information field." The cell information field is the "cargo bay" of the ATM cell and functions as the repository for the user's data (i.e., the information field is analogous to the other portion of the postcard where the sender places whatever data the sender desires the addressee to receive). The book ISDN and Broadband ISDN, 2nd Ed. by William Stallings, Macmillan Publishing Company (1992), provides a good background on ATM technology and ATM adaptation layer protocols and is hereby incorporated by reference.

In wireless telecommunications systems that employ Code Division Multiple Access ("CDMA") technology, the data, whether it represents voice, video or data, is relayed between the wireless terminal and the base station via numerous short messages. For the purpose of this specification, these short messages are called "packets." Insofar as the illustrative embodiment of the present invention interoperates with CDMA technology, the short messages will be called "CDMA packets."

Figure 4:
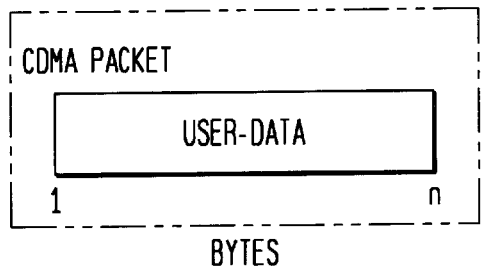
FIG. 4 depicts a CDMA packet.

FIG. 4 depicts the structure of a CDMA packet, which has a length of up to n octets. For the purposes of this specification, the particular data structure and/or error correction technology that is used for internally formatting the packets is irrelevant. This is true for the same reason that the post office's ability to deliver a postcard is not hampered by the language that the letter portion of the postcard is written in so long as the post office can read the address portion. The entire packet, however internally formatted, is deemed to constitute "user-data." For information on CDMA technology and the internal formatting of CDMA packets, the reader is referred to Interim Standard 95 (alternatively known as PN-3118 and "IS-95"), which is published by the Telecommunications Industry Association, Washington, D.C., and which is hereby incorporated by reference.

As stated previously, the illustrative embodiment preferably transmits and/or receives CDMA packets via an ATM network. Unfortunately, the encapsulation of a single CDMA packet into a single ATM cell information field leaves a substantial portion of the capacity of the ATM cell unused, and, thus, wastes a substantial portion of the bandwidth capacity of the ATM network. Therefore, embodiments of the present invention encapsulate multiple CDMA packets into a single ATM cell to more fully exploit the bandwidth capacity of the ATM network. Indeed, in order to exploit even more fully the bandwidth capacity of the ATM network, a CDMA packet can be partitioned between successive cells.

To accomplish this, the illustrative embodiment communicates using an ATM adaptation layer ("AAL") protocol. There are other AALs that have been standardized by CCITT Recommendation I.113, which is incorporated by reference. Furthermore, M. Kunimoto et al., U.S. Pat. No. 5,101,404, issued Mar. 31, 1992, teaches another AAL, which is generally known as "AAL5." The other CCITT AALs and Kunimoto teach techniques for segmenting "large packets" (i.e., packets that are typically larger than the cells) and distributing the parts among several ATM cells in such a way that, at the destination, the various parts can be reclaimed and reassembled to reconstitute the packet. Because of the functionality they provide, each of these techniques constitute what are known as "Segmentation and Reassembly Sublayer" protocols.

In contrast, the illustrative embodiment does not attempt to partition large packets among multiple cells, but attempts to efficiently stuff multiple "small packets" (i.e., packets that are typically smaller than the cells) into a single ATM cell. For this reason, the technique employed by the illustrative embodiment constitutes what might be called an "Aggregation and Disassembly Protocol."

It is understood that the illustrative embodiment is capable of handling both fixed and variable-length packets of up to 64 octets without modification. In circumstances where the illustrative embodiment is not capable of handling larger packets, it will be clear to those skilled in the art how to make and use other embodiments of the present invention that will handle larger packets. In particular, the addition of a "more" field will allow specification of packet extension beyond 64 octets.

II. The Methodology for Encapsulating CDMA Packets into ATM Cells

Figure 5:
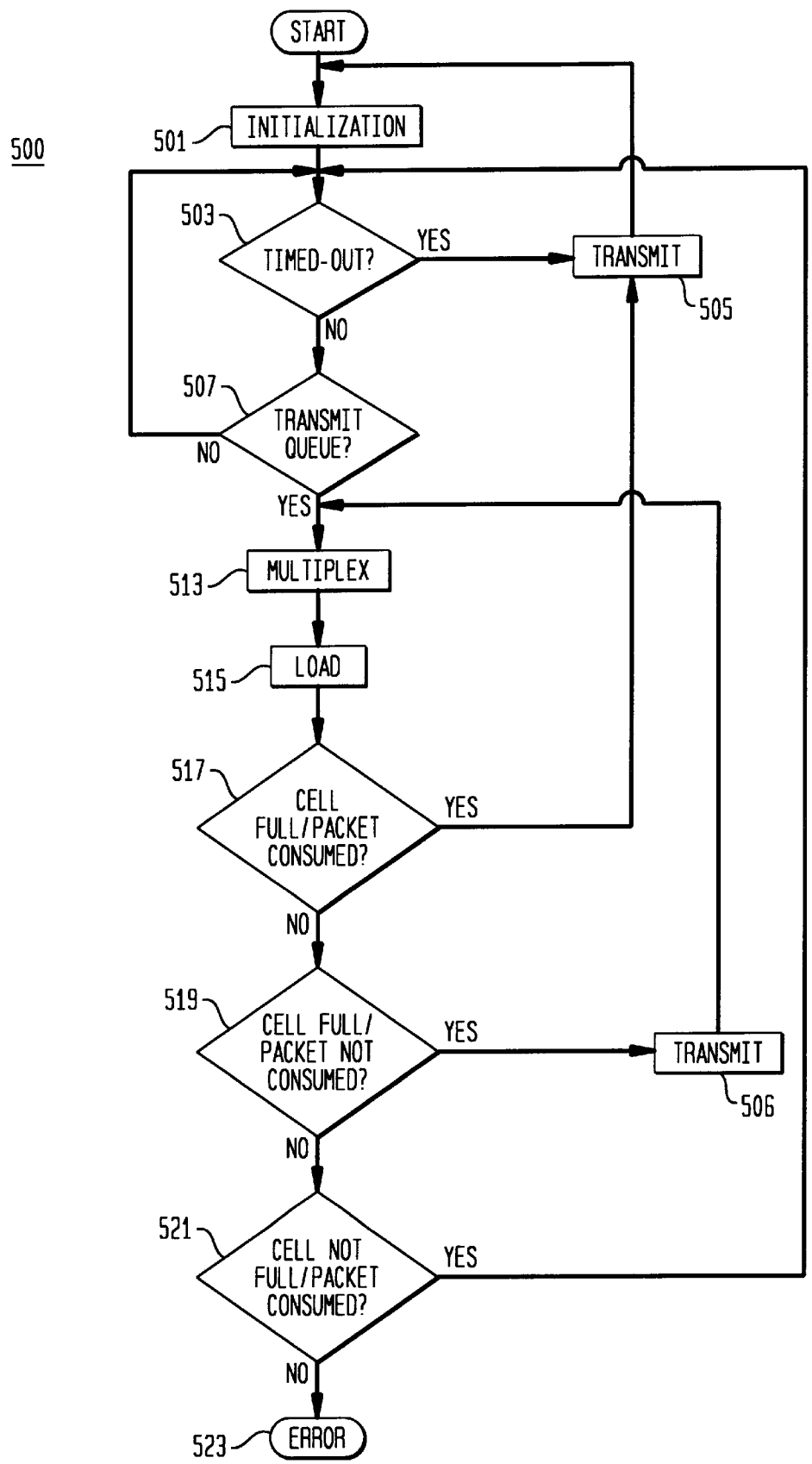
FIG. 5 depicts the flowchart of an illustrative embodiment that can be used to pack the packets into the cells in accordance with the exemplary embodiment.

FIG. 5 depicts a flowchart of the illustrative embodiment of the present invention that is suitable for implementation in custom hardware, as an appropriately programmed general purpose computer, or as a combination of the two. It will be clear to those skilled in the art that some of the depicted operations and tests can be parallelized. Further, it will also be clear to those skilled in the art that some of the operations and tests can be implemented with a combination of hardware and software (e.g., by using an appropriately programmed general purpose processor that is connected, via an interrupt manager, to hardware timers, etc.)

The illustrative embodiment has the capability to multiplex CDMA packets associated with multiple CDMA channels via a single ATM virtual circuit. During the set-up of a channel, ATM channel manager 230 preferably decides which channels are to be carried in a given virtual circuit. The decision of how to multiplex the channels can depend, for example, on empirical or desired traffic engineering criteria, the type of data on the channel and the priority of the user's data.

When ATM channel manager 230 decides which virtual circuit will carry a given channel, ATM channel manager 230 associates that channel (and its packets) with a virtual circuit identifier ("VCI") that is also associated with the virtual circuit. Although the channel (and its packets) have been associated with a VCI, it becomes impossible, without more, for the ATM network destination to sort the incoming packets, which are carried by a single virtual circuit, into their respective channels. To remedy this, when ATM channel manager 230 decides which virtual circuit will carry a given channel, ATM channel manager 230 associates a "channel identifier" with that channel so that the CDMA packets associated with that channel can be unambiguously distinguished by a receiver. The channel identifier is different than the channel identifier given to the other channels with which it is multiplexed. In the illustrative embodiment, sixteen (16) channels can be multiplexed into a single virtual circuit, and, therefore, the channel identifiers are designated from 1 to 16. ATM channel manager 230 then notifies the essential components in system 200 (typically, the ATM network source and destination of the channel) of the channel, its associated channel identifier and is associated virtual circuit. Although the illustrative embodiment can mutliplex up to 16 channels into a single virtual circuit, it will be clear to those skilled in the art how to make and use embodiments of the present invention that can multiplex more than 16 channels.

Referring to FIG. 2, in base station 211, CDMA packets arrive sporadically from the various wireless terminals and are preferably sorted according to their associated VCI and queued for transmission via ATM network 220 to their respective destination. It is preferred that each component in system 200 that encapsulates CDMA packets into ATM cells comprise a first-in first-out ("FIFO") queue (not shown) for each VCI to hold the CDMA packets while they are awaiting transmission. In other words, there should be one transmit queue for each VCI. Table 1 depicts the logical structure of the illustrative transmit queue in accordance with the illustrative embodiment.

TABLE 1

Transmit Queue Data Structure for One Virtual Circuit

| Queue Position | Channel ID | Packet Length | User-Data |
| --- | --- | --- | --- |
| n | | | |
| n + 1 | | | |
| n + 2 | | | |
| ... | | | |
| n + k | | | |

Referring again to FIG. 5, the flowchart depicts a technique that can be used by any component in system 200 to encapsulate CDMA packets into a single virtual circuit prior to their transmission via ATM network 220. The technique preferably begins with an "initialization operation" (block 501), which conceptually prepares a new, empty ATM cell. Because the queued packets can, under some circumstances, be perishable, the initialization operation (block 501) preferably starts a timer (not shown) that is used to assure that all packets meet system timing requirements. In other words, because of the stochastic arrival rate of the packets, there is an inherent trade-off to be made between bandwidth efficiency and latency. The timer setting is used to affect where on this trade-off the embodiment is to operate.

From the initialization operation (block 501), control passes to the "timed-out" test (block 503) which tests how old the current, partially constructed ATM cell is. The length of time used to trip the timed-out test can be set depending on the type of information being transmitted (e.g., video, audio, data), on the perishability of the information, on the priority of the information, and/or on the quality of service ("QOS") requirements for the channel. If the timed-out test (block 503) determines that the current ATM cell is in danger not meeting system timing requirements, then the remaining unused portion of the ATM cell must be unambiguously padded so that the receiver can correctly detect the padding and parse it from the packets. According to the illustrative embodiment, an ATM cell is padded by inserting a Control Octet #1 and a Control Octet #2 (with length indicator set to zero). After the padding is completed, control passes to the "transmit operation" (block 505); otherwise, control passes to the "transmit queue" test (block 507). It will be clear to those skilled in the art how to implement and use other techniques for padding the unused portion of a cell so that at the receiver the padding can be correctly parsed from the packets.

The transmit queue test (block 507) checks to see whether there is a CDMA packet in the transmit queue. If there is, then the CDMA packet is taken from the queue and control passes to the "multiplex operation" (block 513). The task of the multiplex operation (block 513) is to construct a linear data structure in the ATM cell information field that permits: (1) the encapsulation of multiple CDMA packets into a single ATM cell, (2) the encapsulation of CDMA packets associated with different channels into a single ATM cell, and (3) the splitting of a CDMA packet such that its constituent parts can be carried in successive ATM cells (i.e., across ATM cell "boundaries"). The multiplex operation achieves these tasks by creating a header structure comprising two or more "control octets" for each CDMA packet that is inserted into the ATM cell information field along with the CDMA packet. Although the illustrative embodiment uses two control octets, it will be clear to those skilled in the art that other embodiments of the present invention can use a plurality of control octets.

Figure 6:
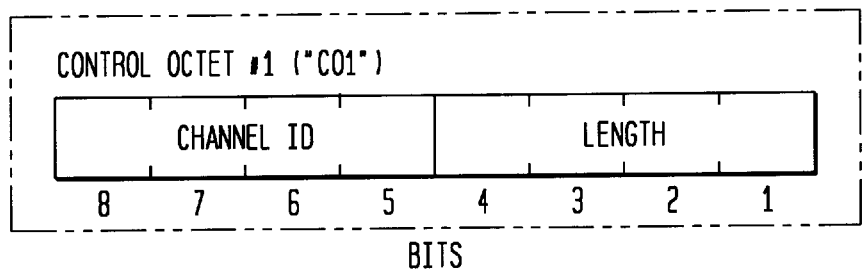
FIG. 6 depicts the format of a Control Octet #1.
Figure 7:
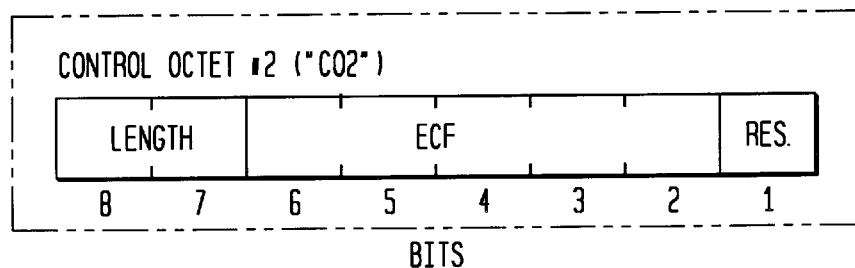
FIG. 7 depicts the format of a Control Octet #2.

The two control octets in the illustrative embodiment, "Control Octet #1" ("CO1") and "Control Octet #2" ("CO2"), each comprise eight bits. The format of Control Octet #1 is depicted in FIG. 6; the format of Control Octet #2 is depicted in FIG. 7. Control Octet #1 and Control Octet #2 together advantageously contain four fields, which can be in any order but which preferably are as shown in FIG. 6.

The four fields advantageously contain (1) a length indicator based on the number of octets in the associated packet, (2) a channel indicator based on the channel associated with the associated packet, (3) an error correction field based on all or a portion of the data in the two control octets for detecting and/or correcting the data in the other fields, and (4) an undefined field, which is reserved for future use.

Reading from left to right, Control Octet #1 preferably comprises: (1) the "channel ID" field of four bits, which corresponds to the channel indicator, and (2) the first four of six bits of the "packet length" field, which correspond to a portion of the length indicator. Reading again from left to right, Control Octet #2 preferably comprises: (1) the last two of the six bits in the "packet length" field, which correspond to a portion of the length indicator, (2) the "error correction field" ("ECF") of 5 bits, which corresponds to the error correction field, and (3) a "reserved" field of one bit. When more than two control octets are used, additional fields can be incorporated and the number of bits in the stated fields varied from that of the illustrative embodiment.

The virtual packet ID field indicates which channel the succeeding CDMA packet is associated with by the transmitter so that the receiver can consider the payload as belonging to that particular channel. The packet length field indicates the length of the CDMA packet following the control octets, which enables the receiver to correctly parse the end of the instant CDMA packet from the next control octet or padding field.

When a packet is split and carried in more than one cell (i.e, across cell boundaries), each cell that contains a residual portion of the packet preferably begins with at least one control octet, which comprises a packet length field that indicates the number of octets of that packet in the cell. For example, if an N octet packet is bifurcated so that X octets are carried by the first of two cells, then control octet(s) in the second cell associated with the residual portion of the packet should contain a length field that indicates that N–X octets of the packet are contained in the second cell.

In the illustrative embodiment, each cell containing a residual portion of the packet preferably includes a Control Octet #1 and a Control Octet #2 with a packet length field that indicates the number of octets of that packet in the cell.

The ECF field provides error correction and/or detection of the data within Control Octet #1 and Control Octet #2. It will be clear to those skilled in the art that various error correction and/or detection schemes can be used with embodiments of the present invention. For example, a 5 bit CRC can be used for this purpose. In the illustrative embodiment, the ECF field contains a number equal to the total number of "1"s in the other fields of Control Octet #1 and Control Octet #2. The reserved field is unused and left for further expansion. In the illustrative embodiment, the bit in the reserved field is set to "0".

Referring back to FIG. 5, the multiplex operation (block 513) constructs both Control Octet #1 and Control Octet #2 for the CDMA packet that was just removed from the queue and puts them in the next available locations in the information field of the current ATM cell. Then control passes to the "load operation" (block 515).

The load operation (block 515) puts the CDMA packet, or so much of it as will fit, into the information field of the current ATM cell; and passes control to the "cell full/packet consumed" test (block 517). It should be noted that the cell becomes "full" when its information field comprises 48 octets. It should also be noted that Control Octet #1 and Control Octet #2 form part of the information field in ATM cells.

The cell full/packet consumed test (block 517) checks to see whether the current ATM cell content is greater than or equal to 46 octets and that all of the last CDMA packet fit into the ATM cell. If the condition is true, then control passes to the transmit operation (block 505); otherwise, control passes to the "cell full/packet not consumed" test (block 519).

The cell full/pack not consumed test (block 519) checks to see whether the current ATM cell is full and that some of the last CDMA packet did not fit into the ATM cell. If the condition is true, then control passes to the transmit operation (block 506); otherwise control passes to the "cell not full/packet consumed" test (block 521). The transmit operation (block 506) performs exactly the same function as the transmit operation (block 505) except that afterwards control passes to the multiplex operation (block 513).

The cell not full/packet consumed test (block 521) checks to see whether the current ATM cell is not full and that all of the last CDMA packet did fit into the ATM cell. If the condition is true, then control passes to the timed-out test (block 503); otherwise an error condition has occurred and control passes to an error trap (block 523).

III. The Methodology for Reclaiming CDMA Packets from an ATM Cell Stream

Figure 8:
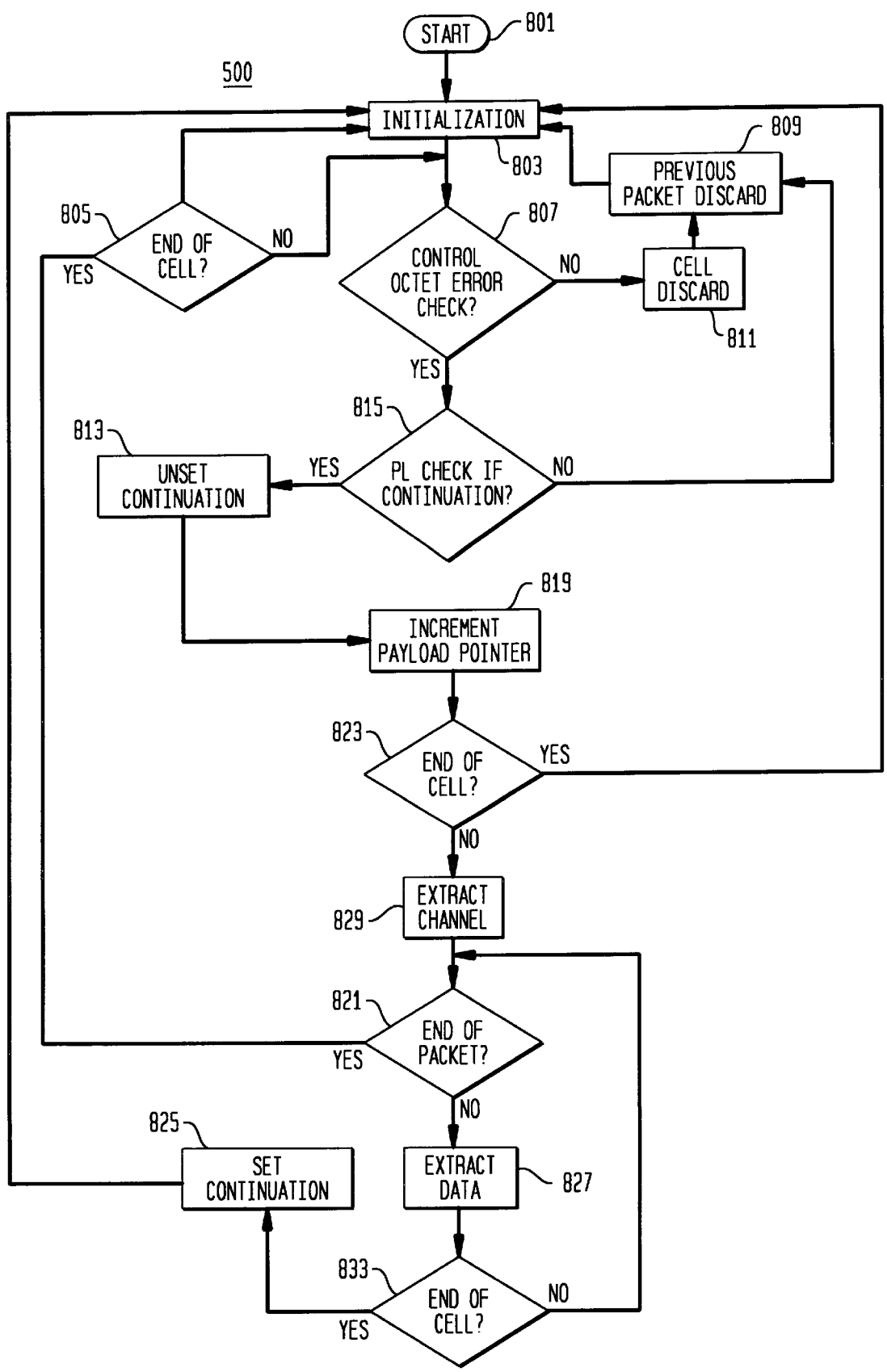
FIG. 8 depicts a flowchart of an illustrative method that can be used to reclaim packet from an ATM cell stream, which packets have been encapsulated in accordance with the exemplary embodiment.

FIG. 8 depicts a flowchart of an illustrative embodiment that can be used to reclaim packets from an ATM cell stream, which packets have been encapsulated in accordance with the illustrative embodiment. It will be clear to those skilled in the art that the generalized technique depicted in FIG. 8 can be implemented in custom hardware, as an appropriately programmed general purpose processor, or as a combination of the two. It will be also clear that many of the depicted operations and tests can be parallelized. Further, it will be clear that many of the depicted operations and tests can be implemented with a combination of hardware and software (e.g., by using an appropriately programmed general purpose processor that is connected, via an interrupt manager, to hardware timers, etc.).

As shown in FIG. 2, the illustrative embodiment of the present invention advantageously receives a stream of ATM cells from ATM network 220. Upon receipt of the ATM cells, it is preferred that they be sorted by VCI and put into VCI-distinct FIFO queues to await processing by the technique shown in FIG. 8. Then, operating advantageously on one queue at a time (at least logically), the illustrative method depicted in FIG. 8 takes the ATM cells from the queue and reclaims the encapsulated CDMA packets.

Referring again to FIG. 8, the technique preferably begins with the "start operation" (block 801), which sets the flag "continuation" to binary "FALSE." From the start operation (block 801) control passes to the "initialization operation" (block 803), which (1) resets a pointer called "atmpayload" to 1; and (2) takes an ATM cell (the "current" ATM cell) from the FIFO queue. From the initialization operation (block 803) control passes to the "control octet error check" test (block 807). The control octet error check test then: (1) retrieves the next two octets (the first of which is pointed to by the atmpayload pointer) from the current ATM cell, which are Control Octet #1 and Control Octet #2, (2) retrieves the data from the error correction field in Control Octet #2, and (3) detects and, if possible, corrects any errors in Control Octet #1 or Control Octet #2. If an error is detected that could not be corrected, then control passes to the "cell discard" operation (block 811); otherwise control passes to the "packet-length-if-continuation" test (block 815).

The cell discard operation (block 811) preferably discards the current ATM cell and directs that the first packet in the next ATM cell also be discarded. From the cell discard operation, control passes to the "previous packet discard" operation (block 809). The previous packet discard operation (block 809) determines whether the current ATM cell was intended to contain a latter portion of a packet whose initial portion was transmitted in the previous ATM cell. If it was, then the previous packet discard operation (block 809) discards the most previously reclaimed packet; otherwise the operation does nothing. From the previous packet discard operation (block 809) control passes back to the initialization operation (block 803).

The packet-length-if-continuation test (block 815) checks whether the flag continuation is true and verifies that the remainder of the packet length is correct. If the test is true, then control passes to the "unset continuation" operation (block 813); otherwise control passes to the previous packet discard operation (block 809). The unset continuation operation (block 813) both (1) sets the continuation flag to FALSE, and (2) sets the variable "packet_length" to the contents of the packet length field from Control Octet #1 and Control Octet #2. From the unset continuation operation (block 813) control passes to the "increment payload pointer" operation (block 819).

The increment payload pointer operation (block 819) increments the contents of the atmpayload pointer by two (one for Control Octet #1 and one for Control Octet #2) and then passes control to the "first end of cell" test (block 823). The first end of cell test (block 823) determines whether the atmpayload pointer equals or exceeds 49, or if padding exists, which is determined by detecting that the length indicator in Control Octet #1 and Control Octet #2 is set to zero. If it does, then control passes to the initialize operation (block 803); otherwise, control passes to the extract channel operation (block 829).

The extract channel operation (block 829) sets a variable "channel" equal to the contents of the channel field in Control Octet #1 and passes control to the end of packet test (block 821). The end of packet test (block 821) checks whether the contents of the variable packet_length is equal to zero. If it is, then control passes to the "second end of cell" test (block 805); otherwise control passes to the "extract data" operation (block 827). The second end of cell test (block 805) determines whether the atmpayload pointer equals or exceeds 49. If it does, then control passes to the initialization operation (block 803); otherwise control passes to the control octet error check operation (block 807). The extract data operation (block 827): (1) extracts a byte from the ATM cell information field pointed to by the atmpayload pointer, (2) increments by one the atmpayload pointer, and (3) decrements by one the packet_length variable. The extracted byte is a part of the reclaimed CDMA packet.

The extract data operation (block 827) then passes control to the "third end of cell" test (block 833). The third end of cell test determines whether the atmpayload pointer equals or exceeds 49. If it does, then control passes to the "set continuation" operation (block 825); otherwise control passes back to the end of packet test (block 821). The set continuation operation (block 825) sets the continuation flag to TRUE if, and only if, the variable packet_length equals zero. The set continuation operation (block 825) then passes control back to the initialize operation (block 803).

IV. An Illustrative Example

For pedagogical purposes, this section details an example of how the illustrative embodiment of the present invention encapsulates two channels between four users. Referring to Table 2, the example is that one user, Alice, using wireless terminal 201, is transmitting a message on a first channel with a second user, Bill, using wireline terminal 202, and desires to transmit to Bill the 60 byte ASCII encoded message "The fault, dear Bill, is not in our stars, but ourselves."

TABLE 2

Alice's Message to Bill

| | |
|---|---|
| CDMA Packet #1 (23 octets) | The_fault,_dear_Bill_i |
| CDMA Packet #2 (23 octets) | s_not_in_our_stars,_but |
| CDMA Packet #3 (13 octets) | _in_ourselves. |

At the same time that Alice is sending her message to Bill, a third user, Chuck, using wireless terminal 203, is transmitting a message on a second channel with a fourth user, Dave, using wireless terminal 204, and desires to transmit to Dave the 13 byte ASCII encoded message: "Et tu, Brute?" which is contained within a single CDMA packet as shown in Table 3.

TABLE 3

Chuck's Message to Dave

| | |
|---|---|
| CDMA Packet #1 (13 octets) | Et_tu,_Brute? |

During call set-up between Alice and Bill, ATM channel manager 230 decides to multiplex their call on the same virtual circuit as the call between Chuck and Dave. ATM channel manager 230 assigns the channel between Alice and Bill the channel ID of "3". Furthermore, ATM channel manager 230 assigns the channel between Chuck and Dave the channel ID of "7".

As shown in Table 4, base station receives the four CDMA packets in the following order: CDMA Packet #1 from Alice, CDMA Packet #1 from Chuck, CDMA Packet #2 from Alice and CDMA Packet #3 from Alice. Because each of the four packets will be transported on the same virtual circuit, they are put into a single FIFO queue for transmission.

TABLE 4

The Transmit Queue

| Queue Position | Channel ID | Packet Length | User-Data |
|---|---|---|---|
| 1 | 3 | 23 | The_fault,_dear_Bill_i |
| 2 | 7 | 13 | Et_tu,_Brute? |
| 3 | 3 | 23 | s_not_in_our_stars,_but |
| 4 | 3 | 13 | _in_ourselves. |

Assuming that there are no other packets to be transmitted on the same virtual circuit, the four CDMA packets in the transmit queue are encapsulated into two successive ATM cells as shown in Table 5 and 6.

TABLE 5

ATM Cell#1

| | | | | |
|---|---|---|---|---|
| 00 | 00 | 00 | 00 | four octets of ATM cell header |
| 00 | 35 | CC | 54 | one byte of ATM cell header; CO1; CO2; user-data "T" |
| 68 | 65 | 20 | 66 | user-data "he_f" |
| 61 | 75 | 6C | 74 | user-data "ault" |
| 2C | 20 | 64 | 65 | user-data ",_de" |
| 61 | 72 | 20 | 42 | user-data "ar_B" |
| 69 | 6C | 6C | 2C | user-data "ill," |
| 20 | 69 | 73 | 4C | user-data "_i"; CO1; CO2 |
| 45 | 74 | 20 | 74 | user-data "Et_t" |
| 75 | 2C | 20 | 42 | user-data "u,_B" |
| 72 | 75 | 74 | 65 | user-data "rute" |
| 3F | 35 | CC | 73 | user-data "?"; CO1; CO2; user-data "s" |
| 20 | 6E | 6F | 74 | user-data "_not" |
| 20 | | | | user-data "_" |

TABLE 6

ATM Cell #2

| | | | | |
|---|---|---|---|---|
| 00 | 00 | 00 | 00 | four octets of ATM cell header |
| 00 | 34 | 48 | 69 | one byte of ATM cell header; CO1; CO2; user-data "i" |
| 6E | 20 | 6F | 75 | user-data "n_ou" |
| 72 | 20 | 73 | 74 | user-data "r_st" |
| 61 | 72 | 73 | 2C | user-data "ars," |
| 20 | 62 | 75 | 74 | user-data "_but" |
| 33 | 4A | 20 | 69 | CO1; CO2; user-data "_i" |
| 6E | 20 | 6F | 75 | user-data "n_ou" |
| 72 | 73 | 65 | 6C | user-data "rsel" |
| 76 | 65 | 73 | 2E | user-data "ves." |
| 00 | 00 | 00 | 00 | CO1; CO2; 2 padding octets |

TABLE 6-continued

ATM Cell #2

| | | | | |
|---|---|---|---|---|
| 00 | 00 | 00 | 00 | 4 padding octets |
| 00 | 00 | 00 | 00 | 4 padding octets |
| 00 | | | | 1 padding byte |

V. Hardware System

Figure 9:
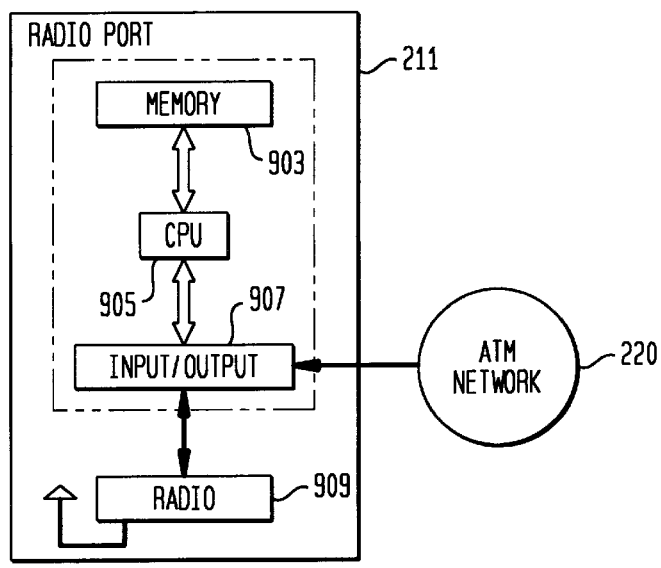
FIG. 9 depicts a hardware implementation of the exemplary embodiment.

FIG. 9 depicts a schematic drawing of an illustrative radio port that is capable of encapsulating CDMA packets into ATM cells in accordance with the illustrative embodiment, and is also capable of reclaiming CDMA packets from an ATM cell stream, which packets were encapsulated in accordance with the illustrative embodiment. It should be noted that embodiments of the present invention are advantageously found in all those network elements that either initiate or terminate the AAL associated with embodiments of the present invention.

Radio port 211 advantageously comprises: central processing unit ("CPU") 905 input/output circuitry 907, memory 903, and radio 909. It is preferred that memory 903 contain procedures for implementing the procedures described above with respect to FIGS. 5 and 8. It will be clear to those skilled in the art how to code these procedures from the above disclosure.

What is claimed is:

1. A method for multiplexing a first packet associated with a first channel identifier and comprising M octets, where M is a natural number, and a second packet associated with a second channel identifier and comprising N octets, where N is a natural number, into a cell information field, said method comprising:
building a first control octet #1 and a first control octet #2 that comprise:
(1) a first channel indicator based on said first channel identifier, and
(2) a first length indicator based on M;
building a second control octet #1 and a second control octet #2 that comprise:
(1) a second channel indicator based on said second channel identifier, and
(2) a second length indicator based on N; and
packing said first control octet # 1, said first control octet #2, said first packet, said second control octet #1, said second control octet #2 and said second packet into said information field.

2. The method of claim 1 wherein said step of packing further comprises concatenating said first control octet #1, said first control octet #2, said first packet, said second control octet #1, said second control octet #2 and said second packet into said cell information field.

3. The method of claim 1 wherein said first control octet #1 and said first control octet #2 further comprise a first error correction field based on said first channel indicator and said first length indicator, and said second control octet #1 and said second control octet #2 further comprise a second error correction field based on said second channel indicator and said second length indicator.

4. The method of claim 1 further comprising the step of aligning said first control octet #1 with a boundary of said cell information field.

5. The method of claim 1 wherein said first channel indicator and said second channel indicator each consist of 4 bits.

6. The method of claim 5 wherein said first length indicator and said length indicator each consist of 6 bits.

7. The method of claim 5 wherein said first error correction field and said second error correction field each consist of 5 bits.

8. A method for multiplexing a first packet associated with a first channel identifier and comprising M octets, where M is a natural number, and a second packet associated with a second channel identifier and comprising N octets, where N is a natural number, into a cell information field, said method comprising:
building a first plurality of control octets that comprise:
(1) a first channel indicator based on said first channel identifier, and
(2) a first length indicator based on M;
building a second plurality of control octets that comprise:
(1) a second channel indicator based on said second channel identifier, and
(2) a second length indicator based on N; and
packing said first plurality of control octets, said first packet, said second plurality of control octets and said second packet into said cell information field.

9. The method of claim 8 further comprising the steps of:
associating said first channel identifier with a first channel;
associating said second channel identifier with a second channel.

10. The method of claim 8 wherein said step of packing further comprises concatenating said first plurality of control octets, said first packet, said second plurality of control octets and said second packet into said cell information field.

11. The method of claim 8 wherein said first plurality of control octets further comprise a first error correction field based on said first channel indicator and said first length indicator, and said second plurality of control octets further comprise a second error correction field based on said second channel indicator and said second length indicator.

12. The method of claim 8 further comprising the step of aligning said first plurality of control octets with a boundary of said cell information field.

13. The method of claim 8 wherein said first channel indicator and said second channel indicator each consist of 4 bits.

14. The method of claim 12 wherein said first length indicator and said length indicator each consist of 6 bits.

15. The method of claim 5 wherein said first error correction field and said second error correction field each consist of 5 bits.

16. A method for multiplexing a first packet associated with a first channel identifier and comprising M octets, where M is a natural number, and a second packet associated with a second channel identifier and comprising N octets, where N is a natural number, into a first cell information field associated with a first cell and into a second cell information field associated with a second cell, said method comprising:
building a first plurality of control octets that comprise:
(1) a first channel indicator based on said first channel identifier,
(2) a first length indicator based on M;
building a second plurality of control octets that comprise:
(1) a second channel indicator based on said second channel identifier,
(2) a second length indicator based on N;
packing said first plurality of control octets, said first packet, said second plurality of control octets and X octets of said second packet into said first cell information field;

building at least one control octet that comprises:
(1) a third length indicator based on N–X, where X is a natural number;

packing said at least one control octet and N–X octets of said second packet into said second cell information field.

17. The method of claim 16 wherein said step of packing said first plurality of control octets further comprises concatenating said first plurality of control octets, said first packet, said second plurality of control octets and said second packet into said cell information field.

18. The method of claim 16 wherein said first plurality of control octets further comprise a first error correction field based on said first channel indicator and said first length indicator, and said second plurality of control octets further comprise a second error correction field based on said second channel indicator and said second length indicator.

19. The method of claim 16 further comprising the step of aligning said first plurality of control octets with a boundary of said cell information field.

20. The method of claim 16 wherein said first channel indicator and said second channel indicator each consists of 4 bits.

21. The method of claim 20 wherein said first length indicator and said length indicator each consist of 6 bits.

22. The method of claim 20 wherein said first error correction field and said second error correction field each consist 5 bits.

* * * * *